Jan. 31, 1967   E. W. SOWARDS   3,301,384
COMPENSATING ROLLER AND LIMIT MEANS THEREFOR
Filed March 19, 1965   4 Sheets-Sheet 1

Edward W. Sowards
INVENTOR.

BY *Clarence A. O'Brien*
*and Harvey B. Jackson*
Attorneys

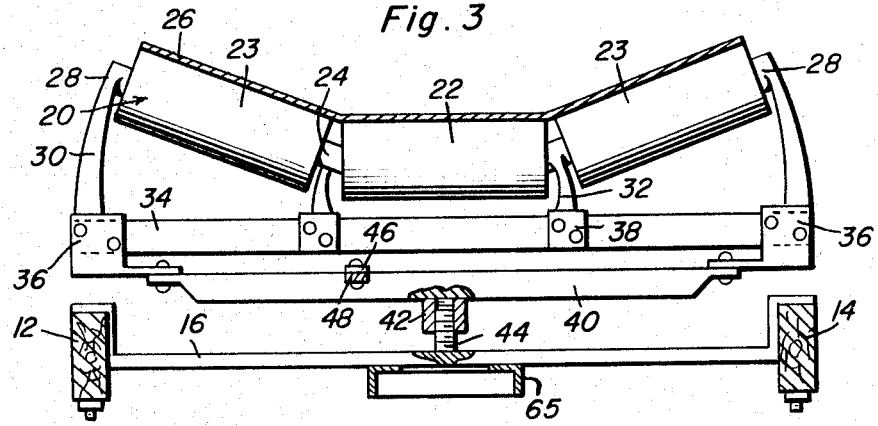
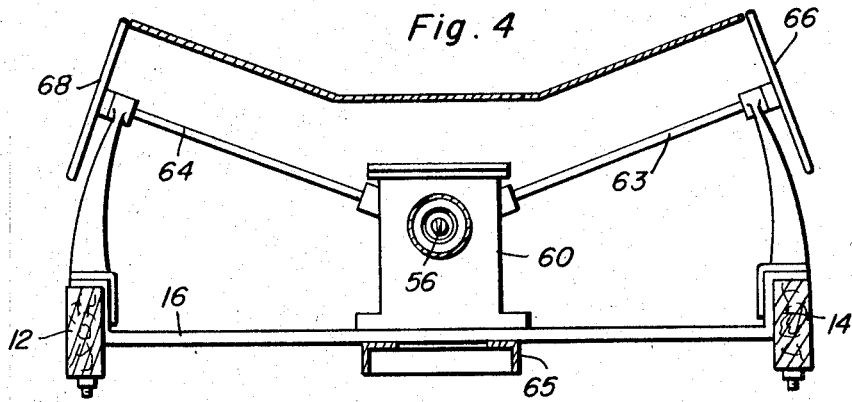
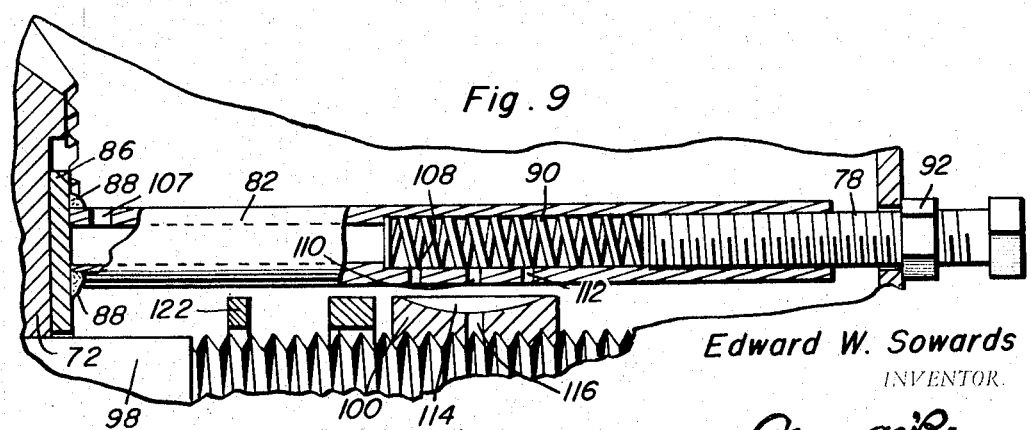

Jan. 31, 1967 E. W. SOWARDS 3,301,384
COMPENSATING ROLLER AND LIMIT MEANS THEREFOR
Filed March 19, 1965 4 Sheets-Sheet 3

Edward W. Sowards
INVENTOR.

BY Clarence A. O'Brien
and Harvey B. Jacobson
Attorneys

Jan. 31, 1967   E. W. SOWARDS   3,301,384
COMPENSATING ROLLER AND LIMIT MEANS THEREFOR
Filed March 19, 1965   4 Sheets-Sheet 4

Edward W. Sowards
INVENTOR.

United States Patent Office
3,301,384
Patented Jan. 31, 1967

3,301,384
COMPENSATING ROLLER AND LIMIT
MEANS THEREFOR
Edward W. Sowards, Rte. 1, Box 705, Love Creek Road,
Ben Lomond, Calif. 95005
Filed Mar. 19, 1965, Ser. No. 441,020
9 Claims. (Cl. 198—202)

This invention relates in general to new and useful improvements in roller assemblies for conveyor belts, and more specifically to an automatic compensating roller for conveyor belts, and to a limit means for limiting the amount of compensating adjustment on the roller assembly caused by the automatic compensating roller. This invention is an improvement over my prior Patent No. 2,783,871 issued March 5, 1957, for Automatic Compensating Roller for Belts.

An object of the present invention is to eliminate locking of the compensating pulley or roller assembly used to convey the belt, which locking may occur when the pulley assembly is adjusted beyond a safe limit.

A further object of this invention is to provide a means whereby the amount of travel of the roller assembly in compensating for the conveyor belt being varied from its normal path of travel may be set at a predetermined level.

A still further object of the present invention is to provide a means for disengaging the driving connection with the wheels that contact the belt to compensate for the belt varying from its normal path of travel to thereby prevent locking of the roller assembly in its adjusting movement.

The compensating roller and limit means therefor of this invention can be adapted to machinery other than conveyors where alignment is required. The unit of this invention is enclosed thereby making it dustfree. The aligning wheels of the present invention are designed so that the conveyor belt will run on top of the wheels to thereby eliminate fraying of the belt edge. The compensating unit and limit means are self-contained in a single unit adapted to run in oil.

A further object of this invention is to provide an improved mounting for a compensating roller, the mounting including a bearing at the center of the roller assembly pivotally connected to a supporting frame, and a lever arm connected to the roller assembly for moving the roller assembly about in its bearing, and means for limiting the amount of movement of the roller assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a transverse vertical sectional view taken substantially upon a plane along section line 3—3 of FIGURE 1 and showing the general details for supporting the roller assembly;

FIGURE 4 is a transverse vertical sectional view taken substantially upon a plane along the section line 4—4 of FIGURE 1 and showing the details of the drive means for effecting pivoting of the compensating roller;

Figure 5:
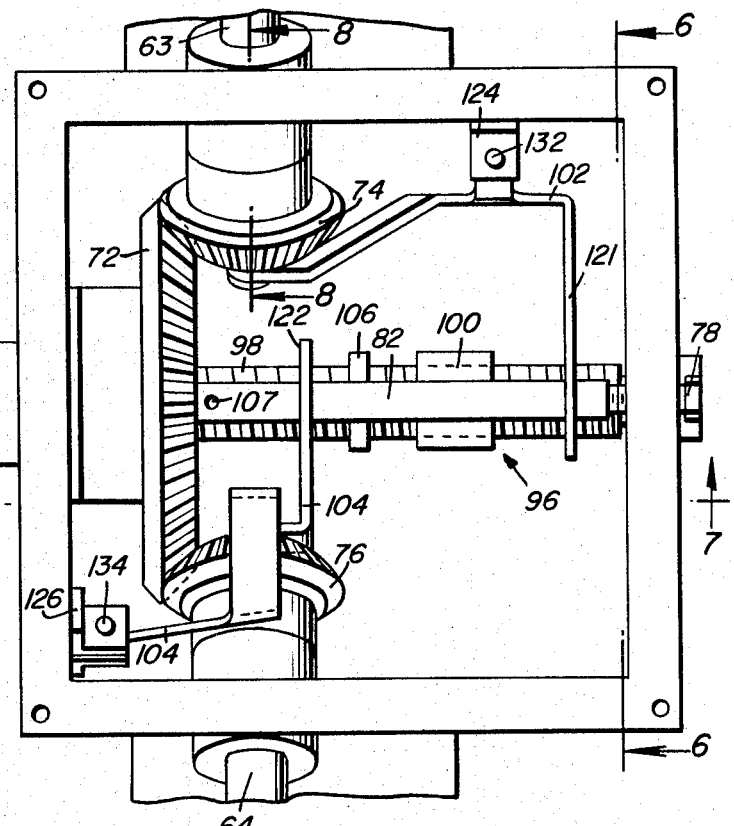
FIGURE 5 is a top view of the gear box with the lid thereof removed to show the linkage and structure for disengaging the pinion gears.
Figure 6:
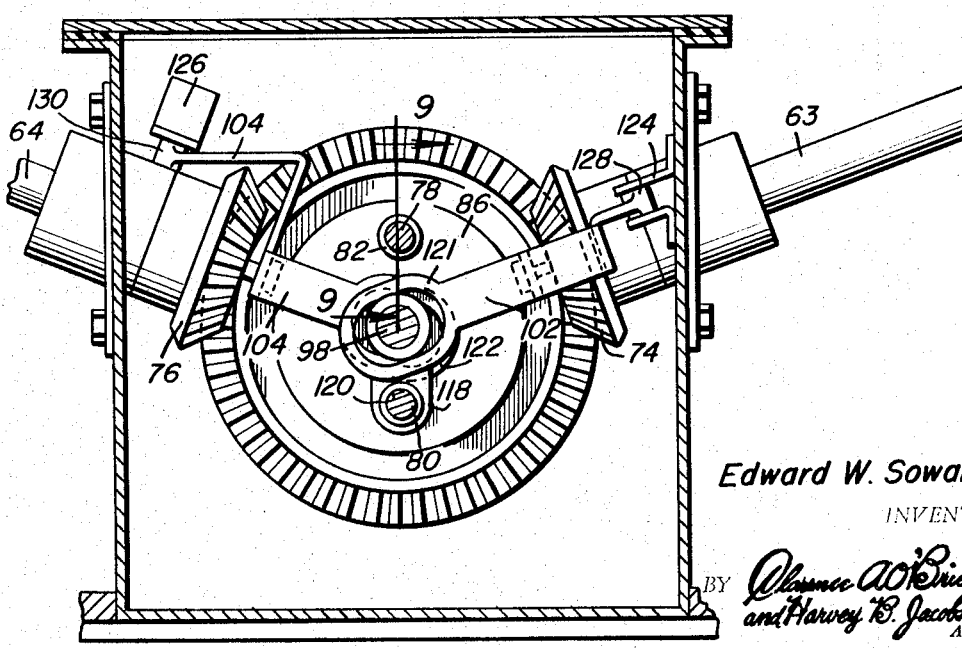
FIGURE 6 is a vertical sectional view of the gear box assembly taken substantially upon a plane along section line 6—6 of FIGURE 5.
Figure 8:
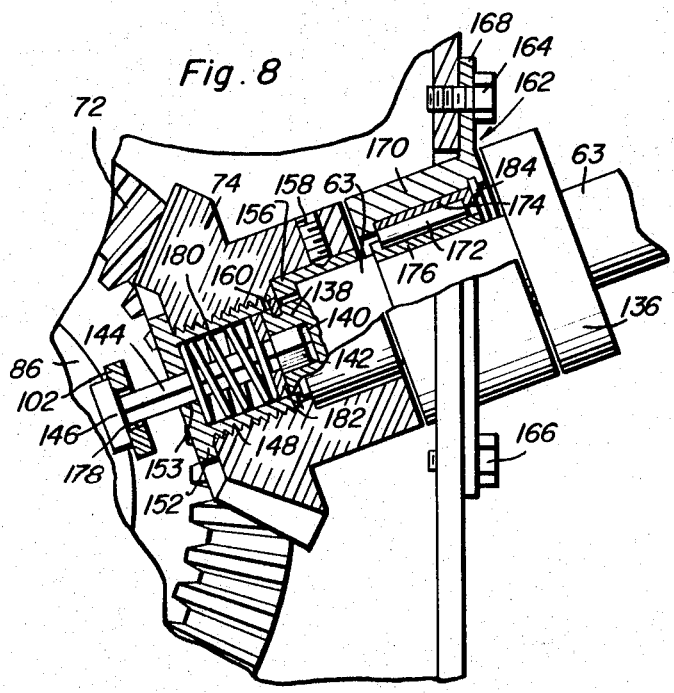

FIGURE 8 is an enlarged fragmentary vertical sectional view taken substantially upon a plane along section line 8—8 of FIGURE 5 showing the clutch mechanism in the pinion gear for disengagement thereof; and FIGURE 9 is an enlarged vertical sectional view taken substantially upon a plane passing along section line 9—9 of FIGURE 6 and showing the top supporting post for maintaining the ring gear in position, and showing the oiling means therein for oiling the mechanism of this invention.

Referring now more particularly to the drawings in detail, it will be seen that there is illustrated a conveyor belt roller supporting frame which is referred to in general by the reference numeral 10. The supporting frame 10 includes elongated frame rails 12 and 14 which are connected together by a transverse frame member 16 disposed under the idler roller assembly and by a transverse frame member 18 disposed under the gear box assembly.

Extending between the frame rails 12 and 14 and supported on the transverse frame member 16 is a compensating conveyor belt idler roller assembly 20. The roller or pulley assembly 20 includes a central horizontal roller 22 and inclined rollers 23 and a suitable mounting shaft 24 therefor. The roller assembly 20 is an idler roller and supports a conveyor belt 26 in its path of travel.

Extending between the frame rails 12 and 14 and supported on the transverse frame member 16 is a compensating conveyor belt idler roller assembly 20. The roller or pulley assembly 20 includes a central horizontal roller 22 and inclined rollers 23 and a suitable mounting shaft 24 therefor. The roller assembly 20 is an idler roller and supports a conveyor belt 26 in its path of travel.

The compensating roller assembly 20 is mounted on the frame 10 by bearings 28. The bearings 28 are supported by standards 30, and standards 32 support the mounting shaft 24 thus rotatably supporting the rollers. The standards are mounted on a plate 34, which carries brackets 36 and 38 to which the standards are attached. The brackets 36 are bolted to a supporting plate 40 which has a bearing sleeve 42 secured to the underside thereof and which constitutes a nut mounted on the short section of a bolt 44 attached to the upper side of the transverse rail 16. An ear 46 is attached to the upper side of the supporting plate 40, and has a fulcrum link 48 secured thereto by a pivot pin connection.

Figure 1:
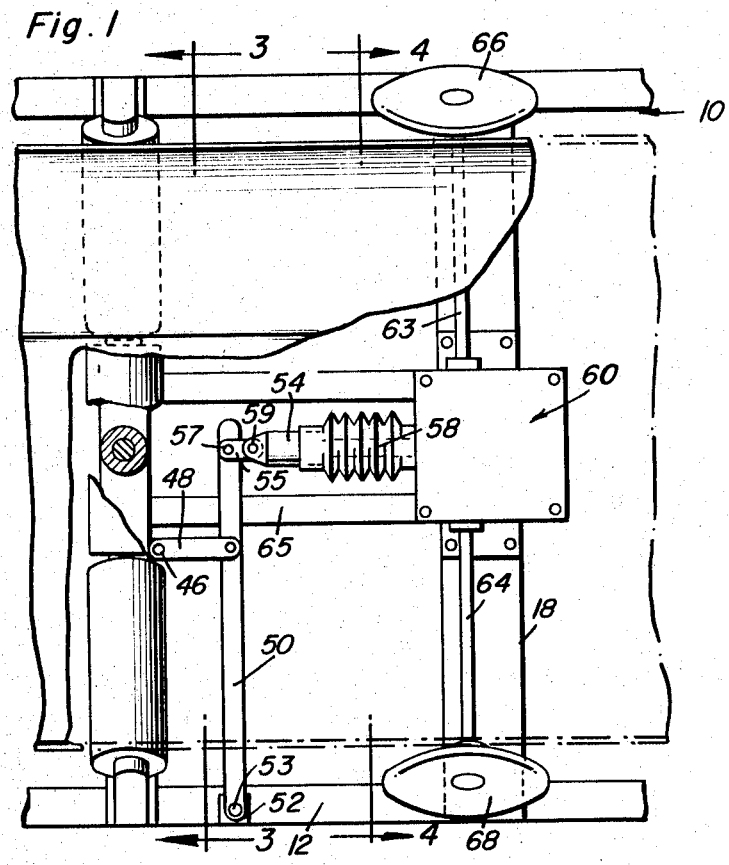
FIGURE 1 is a fragmentary top plan view of the compensating belt roller and the automatic mechanism for actuating the same the belt being broken away to show the gear box housing and the lever arm operating mechanism for the compensating rollers.
Figure 2:
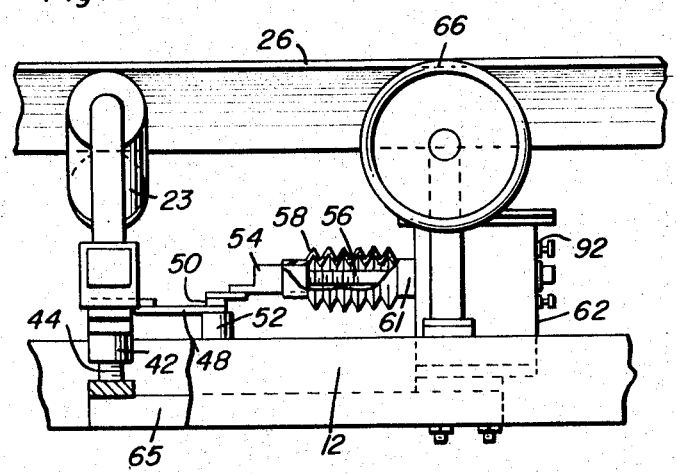
FIGURE 2 is a side elevational view of the idler compensating roller assembly with parts broken away.

Referring now to FIGURE 1 in particular, it will be seen that the fulcrum link 48 is connected to a lever arm 50 which is pivotally secured to the elongated frame rail 12 by a block 52 which is permanently secured to the top of the frame rail 12. The lever arm 50 is connected to a compensating nut and yoke 54 by means of a link 55 which is pivotally attached to the lever arm 50 at 57 and to the yoke at 59.

Connected to the nut yoke 54 is a threaded shaft 56 disposed within a flexible bellows type dust cover 58. The dust cover 58 is mounted to a differential gear box assembly 60 by means of a connecting bushing 61. The differential gear box assembly 60 is mounted on a longitudinally extending plate 65 which is connected to the transverse rails 16 and 18.

In order that the compensating idler roller assembly 20 may be automatically shifted in order to align the conveyor belt 26 when it becomes misaligned, the differential gear box assembly 60 is connected to the lever arm 50 and fulcrum link 48 by the yoke 54 and shaft 56. The differential gear box assembly 60 includes a gear box 62 housing the mechanism for operating shaft 56.

Suitably journaled in bearings carried by the gear box 62 are operating shafts 63 and 64. The shafts 63 and 64 extend from opposite ends of the gear box 62 and are disposed transversely of the longitudinal axis of the supporting frame 10. Adjustably mounted on the outer end of the operating shaft 63 is a wheel 66. A similar wheel 68 is adjustably mounted on the free end of the operating shaft 64 with the wheels being engageable by the belt 26 when it is misaligned.

The front wall of the gear box 62 facing the compensating roller or idler pulley assembly 20 is provided with a bearing 70 which journals the driven shaft 56. The driven shaft 56 has mounted thereon a beveled ring gear 72. Engaged with the ring gear 72 are beveled drive gears or pinion gears 74 and 76 carried by the inner ends of the operating shafts 63 and 64 respectively.

Figure 7:
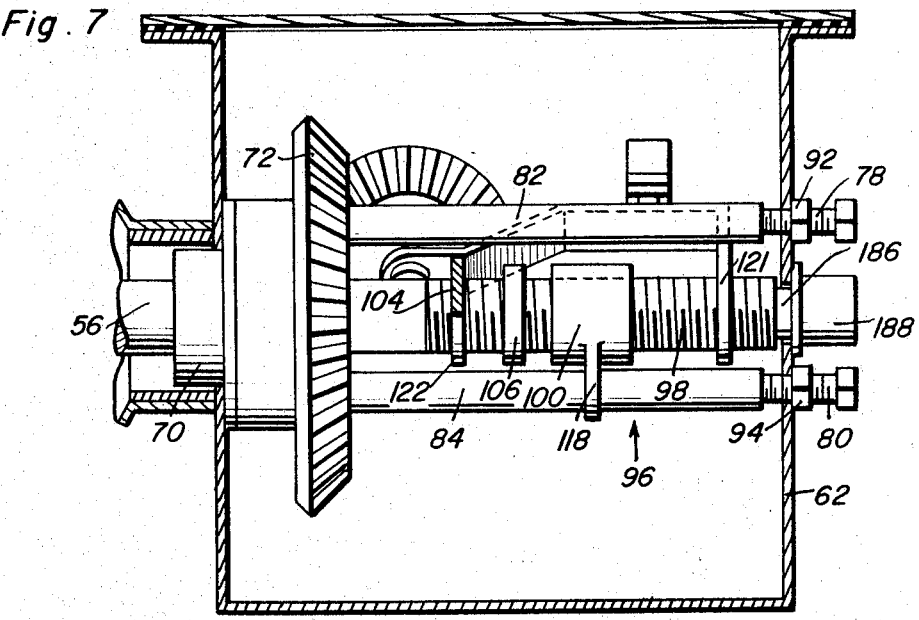
FIGURE 7 is a sectional view of the gear box and gearing assembly of the automatic compensating unit and limit means therefor taken substantially upon a plane along section line 7—7 of FIGURE 5.

Referring now to FIGURES 5 and 7 in particular, it will be seen that there is carried by the side wall of the gear box 62 remote from the idler roller assembly 20 a pair of adjusting screws 78 and 80. The adjusting screws 78 and 80 are received within sleeves 82 and 84 respectively which are welded to a plate 86 by conventional welds 88. The inner ends of the adjusting screws 78 and 80 are engaged with springs 90 only one of which is illustrated in FIGURE 9, and the adjusting screws 78 and 80 are retained in adjusting position by lock nuts 92 and 94. It will be readily apparent that the adjusting screws 78 and 80 serve to vary the engagement of the plate 86 with the ring gear 72.

Inasmuch as the wheels 66 and 68 are spaced apart a distance slightly greater than the width of the conveyor belt 26, they are normally out of engagement with the conveyor belt. However, in the event that the conveyor belt 26 should shift or veer transversely of the compensating idler roller assembly 20, the belt will become engaged with one of the wheels 66 or 68. Assuming that the conveyor belt comes into engagement with the wheel 66, it will proceed to drive that wheel with the result that the operating shaft 63 will be rotated to drive the differential ring gear 72. This will result in rotation of the driven shaft 56. The threaded end of the driven shaft 56 will rotate within the nut yoke 54 and will engage with the threaded means therein. Such rotation of the driven shaft 56 will rotate within the nut yoke 54 and will engage with the threaded means therein. Such rotation of the driven shaft 56 will result in movement of the link 55 and lever arm 50. The lever arm 50 will pivot about its connection 53 to the block 52. Pivoting of the lever arm 50 results in movement of the fulcrum link 48 and in shifting of the supporting base 40 to effect shifting of the axis of the idler roller assembly 20 about the bearing 42 to move the end of the idler roller assembly 20 next to the wheel 66 being rotated towards the wheel 66 and in a direction opposite to the direction of travel of the belt to thereby re-align the belt in its normal path of travel between the wheels 66 and 68. Inasmuch as the wheel 66 will be driven immediately upon a slight misalignment of the conveyor belt 26, only a slight pivoting of the compensating roller or idler pulley assembly 20 will be necessary to return the conveyor belt 26 to its proper alignment. Although the idler roller assembly 20 has been illustrated as a troughing roller assembly for the conveyor belt, it is to be understood that it can be either a plain roller, an end roller or a drive roller as is deemed necessary in a design of the conveyor assembly.

The movement of the idler roller assembly 20 about its pivot bearing 42 is limited by a limiting unit 96 illustrated in detail in FIGURES 5 through 9. The limiting unit 96 comprises a main shaft 98 which is a continuation of the driven shaft 56 and is fixed to the ring gear 72 for rotation therewith. The main shaft 98 has a follower nut 100 thereon which is adapted to move longitudinally on the main shaft 98 in response to rotation thereof. Operably connected to the main shaft 98 is a disengaging lever 102 operably connected to the driven shaft 63, and a pivot lever 104 operably connected to the driven shaft 64. A spacer washer 106 is provided on the main shaft 98 between the follower nut 100 and the lever arm 104 for properly spacing the following nut 100 from the lever arm 104. The spacer washer 106 used may be of a proper thickness to properly adjust the functioning relationship between the follower nut 100 and the lever arm 104. The top sleeve 82 connected to the plate 86 is provided with an oil hole 107 for oiling the main shaft 98. The sleeve 82 is provided with further oil holes, or drip holes 108, 110, and 112, which are drip holes which are adapted to drip oil onto the follower nut 100 as the limit unit is operated. The interior of the sleeve 82 is hollow and will allow retention therein of a sufficient amount of oil for the operation of the limit means over a substantial period of time. When the oil is exhausted, the oil may be replenished by filling the hollow sleeve through the oil hole 107 which will occur by oil dripping from the gears and the like. The top of the follower nut is provided with the groove 114 therein having a curved bottom which constitutes an oil well for carrying oil on the top side of the follower nut. A bore 116 extends through the follower nut from the top side thereof in the groove 114 and will supply oil directly to the threaded portion of the main shaft 98 as the follower nut 100 travels thereon.

The follower nut 100 is prevented from rotation by means of a lateral ear 118 which is connected thereto, which ear has an aperture 120 therein. The sleeve 84 is slipped through the aperture 120 and the nut 100 will be prevented from rotation by its operable connection with the sleeve 84.

The lever arm 102 is engaged with the main shaft 98 by means of an elongated yoke loop 121 and arm 104 is connected by a similar elongated yoke loop 122, respectively. The lever arms 102 and 104 are pivotally connected to brackets 124 and 126, respectively, mounted to the sides of the differential gear box 62 by means of bushings 128 and 130, respectively which have pins 132 and 134 projecting therethrough thus enabling swinging movement of arms 102 and 104 about pins 132 and 134.

The pinion gears 74 and 76 are releasably drivingly connected to their drive shafts 63 and 64 in an identical manner. The releasable connection is illustrated in detail in FIGURE 8. Therefore, only the releasable connection of the pinion gear 74 will be discussed, it being understood, however, that the releasable connection of the pinion gear 76 is identical with that of the pinion gear 74. The drive shaft 63 for the pinion gear 74 has a flange 136 thereon. One end of the driven shaft 63 is reduced in diameter as is illustrated at 138. A polygonal socket or recess 140 is provided in the end of the driven shaft 63 and is axially aligned therewith. Received within the socket 140 is a correspondingly shaped enlarged flange end 142 of a square shank 144 which has an enlarged flange plate 146 at the other end thereof. A threaded bushing 148 is threaded into a threaded bore provided therefor in the pinion gear 74. The bushing 148 has an enlarged flange head 152 at the outer end thereof, which flange head has a square aperture 153 provided therein for slidably receiving the square shank 144.

The driven shaft 63 is rotatably mounted in the pinion gear 74 by a sleeve 156 which is secured to the pinion gear 74 by a set screw 158. The driven shaft 63 is retained within the pinion 74 by a snap ring 160 which is provided on the end of the driven shaft 63 and rotatably connects the shaft 103 to the sleeve 156. The driven shaft 63 is supported in the side of the gear box 62 by a bearing assembly 162 which is removably affixed to the side of the gear box 62 by bolts 164 and 166 which extend through a flange 168 provided on the bearing assembly 162. A main bearing sleeve 170 extends from the flange 168 into the interior of the gear box and has a roller bearing assembly 172 secured thereto including an outer race 174 mounted in the recess in the sleeve 170 and an inner race 176 engaging the periphery of the driven shaft 63.

The levers 102 and 104 are provided with apertures 178 therein which are adapted to fit over the square shank 144 and to bear against the flange plate 146 on the shank 144 for exerting a force against the shank 144 to disengage the square end 142 from the square socket 140 provided in the end of the driven shaft 63. The square end 142 is normally biased into driving relationship with the socket 140 in the driven shaft 63 by means of a coil spring 180 which rests within the bushing 148 and bears against the flange head 152 and against a washer 182 mounted on shank 144 in engagement with the square end 142.

The outer bearing race 174 is retained within a recess provided in the bearing sleeve 170 by a snap ring 184 secured in a recess in the end of the bearing assembly 162. The main shaft 98 has a reduced end 186 which is adapted to rotate within a bearing 188 provided on the face of the gear box 62.

In the operation of the limit unit 96 when the wheel 66 is rotated by the belt 26 veering off its normal path of travel, the shaft 63 will be driven. As the shaft 63 is driven, the shank 144 will be driven by the square end 142 disposed within the square socket 140 in the drive shaft 63. This will cause rotation of the pinion gear 74 since the bushing 148 connected to the pinion gear 74 will be driven by the square shank 144 passing through the square aperture 153 provided in the flange 152 of the bushing 148. As the ring gear 72 is rotated by the pinion gear 74, the follower nut 100 will move towards the yoke 121 until the yoke is moved by the follower nut. As the yoke 121 is moved, the lever arm 102 will pivot about its pivot point 132 in the brackets 124, and as the lever arm 102 pivots, the lever arm will bear against the flange 146 on the shank 144. Thus, the lever arm 102 will force the shank 144 and square end 142 outwardly from the socket 140 in drive shaft 63. This will continue until the square flange 142 clears the square socket 140 provided in the end of the drive shaft 63. At this time, the drive shaft 63 will rotate within the sleeve 156 but will not cause movement of the pinion gear 74 since the square end 142 is clear of its driving connection with the socket 140. Thus, the drive shaft 63 will no longer operate the shaft 56 to move the lever arm 50 and to pivot the pulley assembly 20 about its pivot point 44. Thus, it is seen that this invention provides not only a means for compensating the veering action of a conveyor belt but provides a means for limiting that compensation, whereby the movement of the pulley or roller assembly 20 is limited in its compensating movement. This limit unit is adapted to eliminate locking of the compensating means at the end of its travel, and may be set to adjust the amount of travel of the roller assembly according to desired specifications.

The compensating mechanism and limit means of this invention may be used on other machinery other than conveyors wherever alignment is needed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A control device for maintaining proper running alignment of a conveyor belt on its pulleys, comprising in combination with such conveyor belt; a longitudinal frame, a conveyor pulley assembly, a bearing supporting said conveyor pulley assembly, a transverse frame member supporting said pulley assembly and bearing on said longitudinal frame, a link pivotally connected to said pulley assembly for shifting said pulley assembly by pivotal movement about said bearing, a lever arm pivotally carried on said link and connected to the longitudinal frame supporting said pulley assembly to effect such shifting, a differential gear unit mounted on a transverse frame member connected to said longitudinal frame, a threaded shaft on said differential gear unit connected to said lever arm, and means engageable with said conveyor belt and connected to said differential gear unit and operable when the conveyor belt veers to one side of its regular path of travel for actuating said differential gear unit to move said lever arm in a direction to pivot said pulley assembly to the proper side of the belt to return the belt to its centralized running position on said pulley assembly, said means being in working arrangement with said thread shaft.

2. The control device of claim 1 wherein means are provided on said threaded shaft for disengaging said differential gear unit when said pulley assembly has been pivoted to a predetermined limit.

3. An automatic compensating roller assembly for belts comprising a supporting frame including longitudinal frame members and a transverse frame section extending between and connected to said longitudinal frame members, a main belt supporting roller assembly extending transversely between said longitudinal frame members in spaced relation from said transverse frame section and from said longitudinal frame members, a bearing assembly mounted centrally of said transverse frame section pivotally supporting said roller assembly substantially at the center thereof, a second transverse frame section mounted between said longitudinal frame members, a differential gear unit including a ring gear and ring gear shaft, pinion gears meshed with said ring gear, said pinion gears having connected thereto shafts extending transversely of said supporting frame wheels connected to said pinion gear shafts, said wheels being disposed in the plane of the belt and being spaced apart a distance slightly greater than the width of the belt, said wheels being aligned with said roller assembly, a shifting arm pivotally connected to one of said longitudinal frame members, said shifting arm having a longitudinal linking arm pivotally mounted thereon intermediate the ends thereof and connected to said roller assembly, and a threaded connection between said ring gear and said shifting arm whereby when said ring gear shaft is rotated, said shifting arm is pivoted to pivot said roller assembly.

4. The combination of claim 3 wherein said differential gear unit has limit means incorporated therein for selectively disengaging said pinion gears from said ring gear when the roller assembly has been pivoted to a predetermined limit.

5. Means for correcting side draft of conveyor belts due to uneven loading and the like, said means comprising a supporting idler roll unit on which the belt is carried, a frame on which the unit is pivoted to turn about a vertical axis, wheels on the frame and spaced from the idler roll unit, shafts carried by said wheels, said wheels being at the level of the side edges of the belt, and means driven by said shafts operable by engagement of the belt with either wheel and rotation of its shaft to adjust the angle of the idler roll unit to move the end thereof adjacent to the shaft that is rotated in the direction of travel of the belt, said driven means comprising a differential gear unit geared to both said shafts, and mounted in a housing secured to said frame, a shaft connected between the differential gear unit and the idler roll unit, and means on said shaft adapted to disengage the differential gear unit, said means for disengaging the gear unit comprising levers pivoted to said housing and engaging shanks releasably engageable with the wheel shafts, said shanks being adapted to operate said differential gear unit when engaged with the wheel shafts, one end of said levers being slidably mounted over said shaft connected between the differential gear unit and the roll unit, and means on said last named shaft adapted to move to and fro along the shaft as the shaft is rotated to pivot said levers for disengaging said shanks from the wheel shafts thereby disengaging the differential gear unit.

6. Means for correcting side draft of conveyor belts due to uneven loading and the like, said means comprising a supporting roll unit on which the belt is carried, a frame on which the unit is pivoted to turn about a vertical axis, wheels on the frame spaced from the roll unit, shafts carried by said wheels, said wheels being generally at the level of the side edges of the belt, and means driven by said shafts operable by engagement of the belt with either wheel and rotation of its shaft to adjust the angle of the roll unit, said driven means comprising a gear unit, said gear unit comprising a housing, a ring gear mounted in said housing, a pinion gear mounted on each wheel shaft on opposite sides of the housing and in meshing engagement with the ring gear for rotating said ring gear, means operatively connected with said ring gear for disengaging said pinion gears from their respective wheel shafts upon a predetermined rotation of said ring gear, and linkage means engaged between the ring gear and the roll unit for effecting a selective pivoting of the roll unit in response to a driving of the ring gear.

7. The combination of claim 6 wherein the means connected between the ring gear and the roll unit includes a shaft connected to the ring gear to rotate therewith, said shaft being threaded, a nut on said threaded shaft, said nut being held against rotation whereby the nut will move to and fro on the shaft according to the rotation of the shaft, and means pivotally connected to said housing and operatively connected with said threaded shaft and pinion gears, said means being engageable by said nut on the threaded shaft to pivot about said pivotal connection and disengage said pinion gears from their respective wheel shafts.

8. The combination of claim 7 wherein said means operatively connected with said threaded shaft and pinion gears comprises a pair of levers pivotally mounted on opposite sides of said housing.

9. The combination of claim 8 wherein said pinion gears are releasably engaged to the corresponding wheel shafts by a clutch means operative and releasably biased into driving connection with said wheel shafts, said clutch means having a shank thereon designed to rotate said pinion gears when the clutch means is driven by said wheel shafts, said shank extending beyond the periphery of the pinion gears, and means on the extension of the shank for operatively connecting the levers to the clutch means for disengaging the clutch means from the wheel shafts.

References Cited by the Examiner
UNITED STATES PATENTS

| | | | |
|---|---|---|---|
| 2,488,859 | 11/1949 | Garber | 198—202 |
| 2,720,797 | 10/1955 | Huddleston | 74—713 |
| 2,783,871 | 5/1957 | Sowards | 198—202 |
| 3,118,515 | 1/1964 | Kraus | 74—713 |

ANDRES H. NIELSEN, *Primary Examiner.*

RICHARD E. AEGERTER, *Examiner.*